(12) United States Patent
Kim

(10) Patent No.: US 7,401,400 B2
(45) Date of Patent: Jul. 22, 2008

(54) SYSTEM FOR MOUNTING A SNAP RING

(75) Inventor: Yong Seok Kim, Seoul (KR)

(73) Assignee: Kia Motors Corporation, Seoul (KR)

( * ) Notice: Subject to any disclaimer, the term of this patent is extended or adjusted under 35 U.S.C. 154(b) by 329 days.

(21) Appl. No.: 11/299,355

(22) Filed: Dec. 8, 2005

(65) Prior Publication Data

US 2007/0124920 A1 Jun. 7, 2007

(30) Foreign Application Priority Data

Dec. 1, 2005 (KR) .................. 10-2005-0116355

(51) Int. Cl.
*B23P 21/00* (2006.01)
(52) U.S. Cl. .................. 29/709; 29/712; 29/407.05; 29/407.09; 29/407.1
(58) Field of Classification Search ............. 29/888.07, 29/407.05, 407.09, 407.1, 453, 709, 712, 29/717, 243.56, 451, 229, 252
See application file for complete search history.

(56) References Cited

U.S. PATENT DOCUMENTS

| | | | |
|---|---|---|---|
| 5,077,877 A * | 1/1992 | Piotrowski | 29/229 |
| 5,315,746 A * | 5/1994 | Machino et al. | 29/451 |
| 5,875,536 A | 3/1999 | Ring | |
| 6,212,746 B1 * | 4/2001 | Cooks, Jr. | 29/243.56 |
| 7,131,177 B2 * | 11/2006 | Taylor et al. | 29/450 |

FOREIGN PATENT DOCUMENTS

| | | | |
|---|---|---|---|
| JP | 05-177459 | | 7/1993 |
| JP | 10138053 A | * | 5/1998 |
| JP | 10-263941 | | 10/1998 |
| JP | 11-010457 | | 1/1999 |
| JP | 2002-059322 | | 2/2002 |
| JP | 2003136348 A | * | 5/2003 |

* cited by examiner

*Primary Examiner*—Jermie E Cozart
(74) *Attorney, Agent, or Firm*—Morgan Lewis & Bockius LLP

(57) ABSTRACT

A system for mounting a snap ring to a workpiece includes: a supporting structure; a snap ring guide unit mounted to the supporting structure by a first actuating device; a snap ring assembling unit including a supporting portion connected to the supporting structure by a second actuating device, a snap ring assembling jig, and a third actuating device, which pivots the assembling jig; a snap ring inner diameter measuring unit including a snap ring inner diameter measuring jig pivotally connected to the supporting portion of the snap ring assembling unit, a fourth actuating device, which pivots the inner diameter measuring jig, and a linear gauge that measures the pivotal position of the inner diameter measuring jig; and a control unit controlling the actuating devices and determining, based on a comparison of the measured snap ring mounted diameter and a predetermined value, whether the snap ring has been accurately mounted.

7 Claims, 7 Drawing Sheets

SYSTEM FOR MOUNTING A SNAP RING

CROSS-REFERENCE TO RELATED APPLICATION

This application claims priority to and the benefit of Korean Patent Application No. 10-2005-0116355 filed in the Korean Intellectual Property Office on Dec. 1, 2005, the entire contents of which are incorporated herein by reference.

BACKGROUND OF THE INVENTION (a) Field of the Invention

The present invention relates to a system for mounting a snap ring.

More particularly, the present invention relates to a system for mounting a snap ring and checking whether the snap ring has been accurately mounted.

(b) Description of the Related Art

A conventional system for mounting a snap ring automatically mounts a snap ring to a snap ring mounting position of a workpiece and checks whether or not a snap ring has been mounted. That is, a conventional system cannot check whether a snap ring has been accurately mounted. If a clutch or a brake in which a snap ring is inaccurately mounted is used, the snap ring may shift from its mounted position.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for mounting a snap ring and checking whether a snap ring has been accurately mounted.

A system for mounting a snap ring to a workpiece according to an exemplary embodiment of the present invention includes: a supporting structure; a snap ring guide unit mounted to the supporting structure by a first actuating device, and including a snap ring guide that holds the snap ring and guides the snap ring toward a snap ring mounting position of the workpiece; a snap ring assembling unit including a supporting portion connected to the supporting structure by a second actuating device, a snap ring assembling jig pivotally mounted to the supporting portion and configured to push the snap ring such that the snap ring, which is being held by the snap ring guide unit, can be mounted to a snap ring mounting position, and a third actuating device that pivots the snap ring assembling jig; a snap ring inner diameter measuring unit including a snap ring inner diameter measuring jig pivotally connected to the supporting portion of the snap ring assembling unit, a fourth actuating device that pivots the snap ring inner diameter measuring jig, and a linear gauge that measures a diameter of the mounted snap ring by measuring a pivotal movement of the snap ring inner diameter measuring jig; and a control unit that controls the first, second, third, and fourth actuating devices, and determines, based on a comparison of the snap ring mounted diameter and a predetermined value, whether the snap ring has been accurately mounted.

The third actuating device may rotate the snap ring assembling jig such that a front end of the snap ring assembling jig moves in an outward radial direction of the snap ring guide.

The snap ring inner diameter measuring jig may be configured such that a front end thereof moves in an outward radial direction of the snap ring guide, when the fourth actuating device is off.

The fourth actuating device may actuate the snap ring inner diameter measuring jig such that a front end of the snap ring inner diameter measuring jig moves in an inward radial direction of the snap ring guide.

The control unit may operate the fourth actuating device such that the front end of the snap ring inner diameter measuring jig remains disposed in the inward radial direction of the snap ring guide while the snap ring assembling jig pushes the snap ring toward the workpiece.

DETAILED DESCRIPTION OF THE PREFERRED EMBODIMENTS

Exemplary embodiments of the present invention will hereinafter be described in detail with reference to the accompanying drawings.

Figure 1:
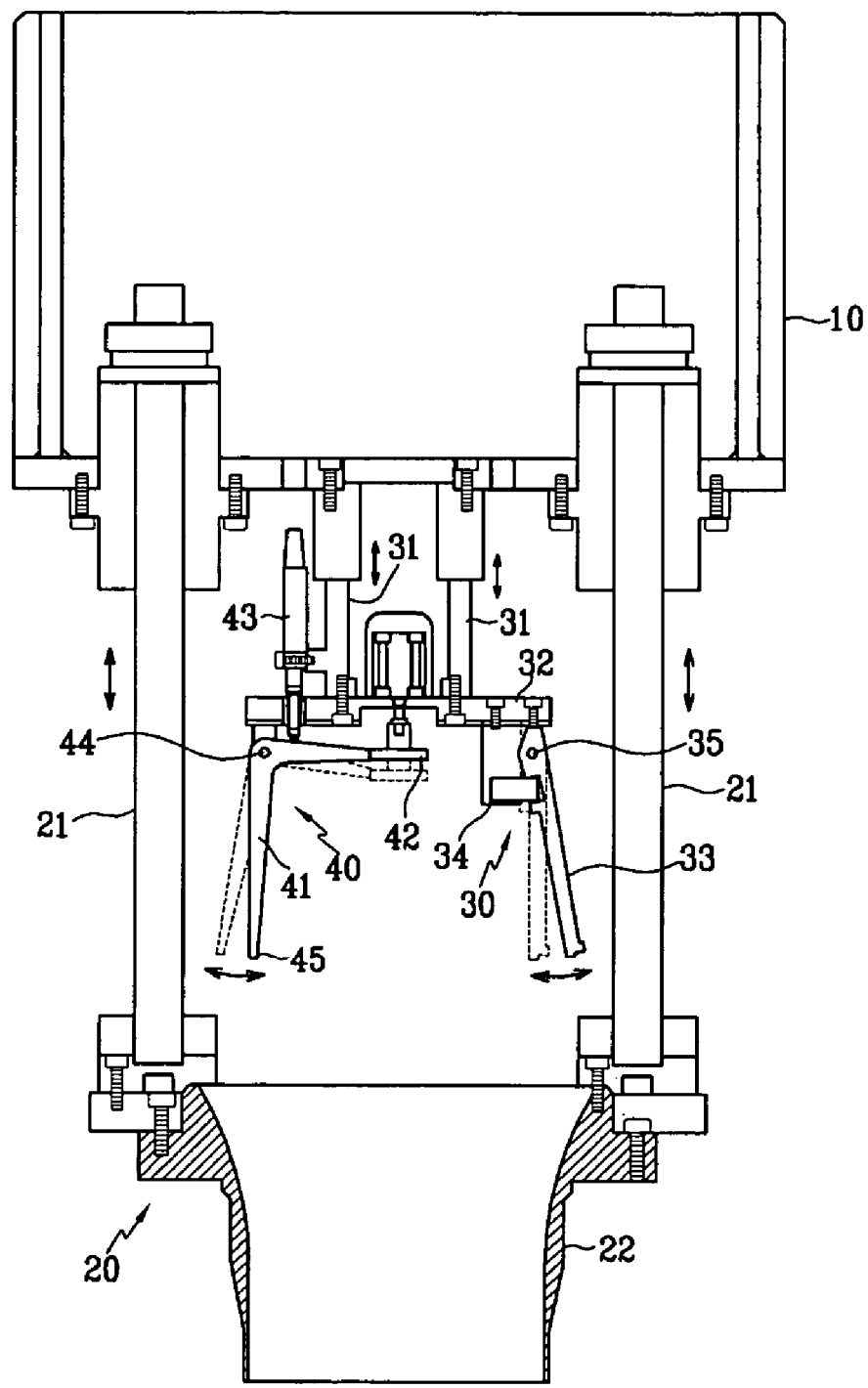
FIG. 1 schematically shows a system for mounting a snap ring according to an exemplary embodiment of the present invention.

Referring to FIG. 1, a system for mounting a snap ring according to an exemplary embodiment of the present invention includes a supporting structure 10. A snap ring guide unit 20, a snap ring assembling unit 30, and a snap ring inner diameter measuring unit 40 are mounted to the supporting structure 10.

Figure 2:
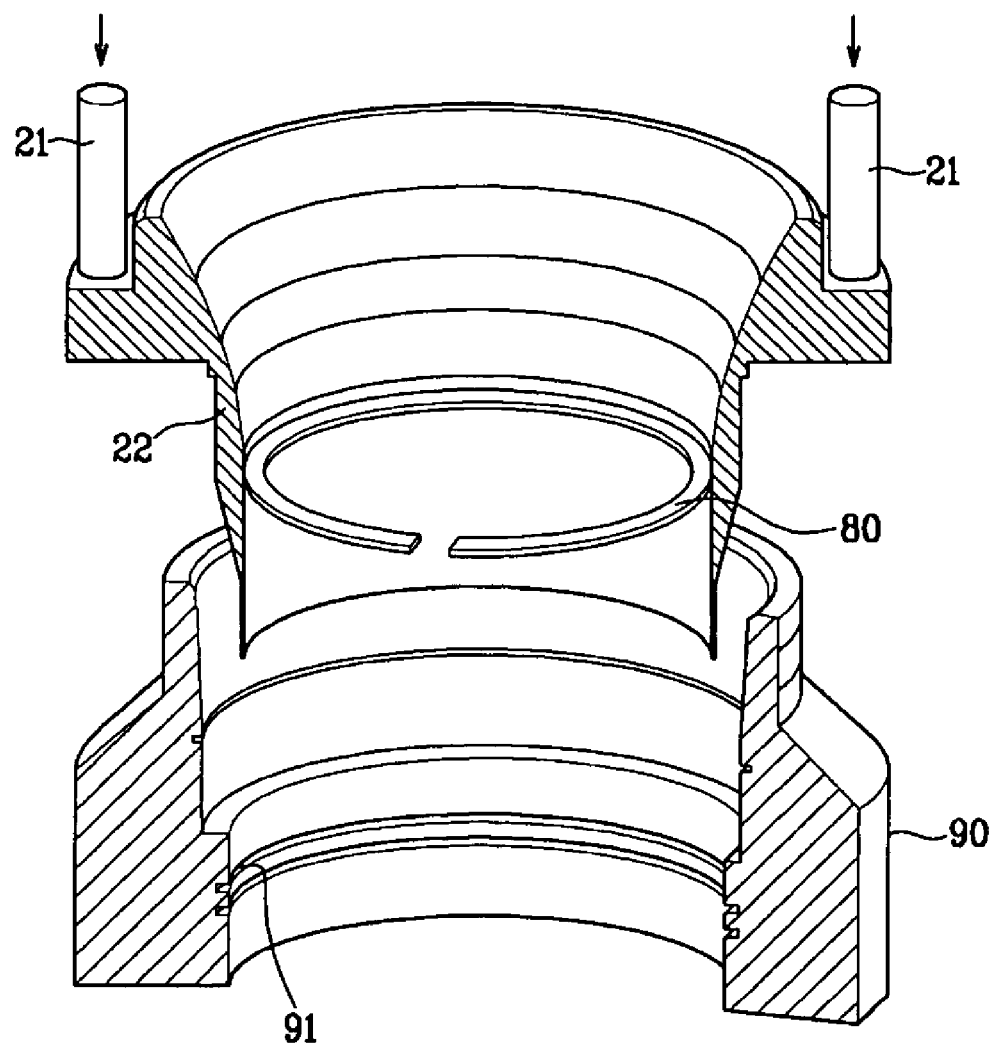
FIG. 2 is a drawing showing an operation of a snap ring guide unit according to a system for mounting a snap ring according to an exemplary embodiment of the present invention.

Referring to FIG. 2, the snap ring guide unit 20 is mounted to the supporting structure 10 by a first actuating device 21, and includes a hollow cylindrical snap ring guide 22. The snap ring guide 22 temporarily holds a snap ring 80, and is formed to guide the snap ring 80 held therein toward a snap ring mounting position 91 of a workpiece 90.

One end of the first actuating device 21 is fixed to the supporting structure 10, and the other end thereof is connected to the snap ring guide 22. The snap ring guide 22 can move with respect to the supporting structure 10 by an operation of the first actuating device 21.

As shown in FIG. 2, the snap ring guide 22 holding a snap ring 80 therein moves toward the workpiece 90 by an operation of the first actuating device 21. Therefore, the snap ring guide 22 guides the snap ring 80 toward the snap ring mounting position 91 of the workpiece 90, which may be a case of a clutch or a brake of an automatic transmission of a vehicle.

Figure 5:
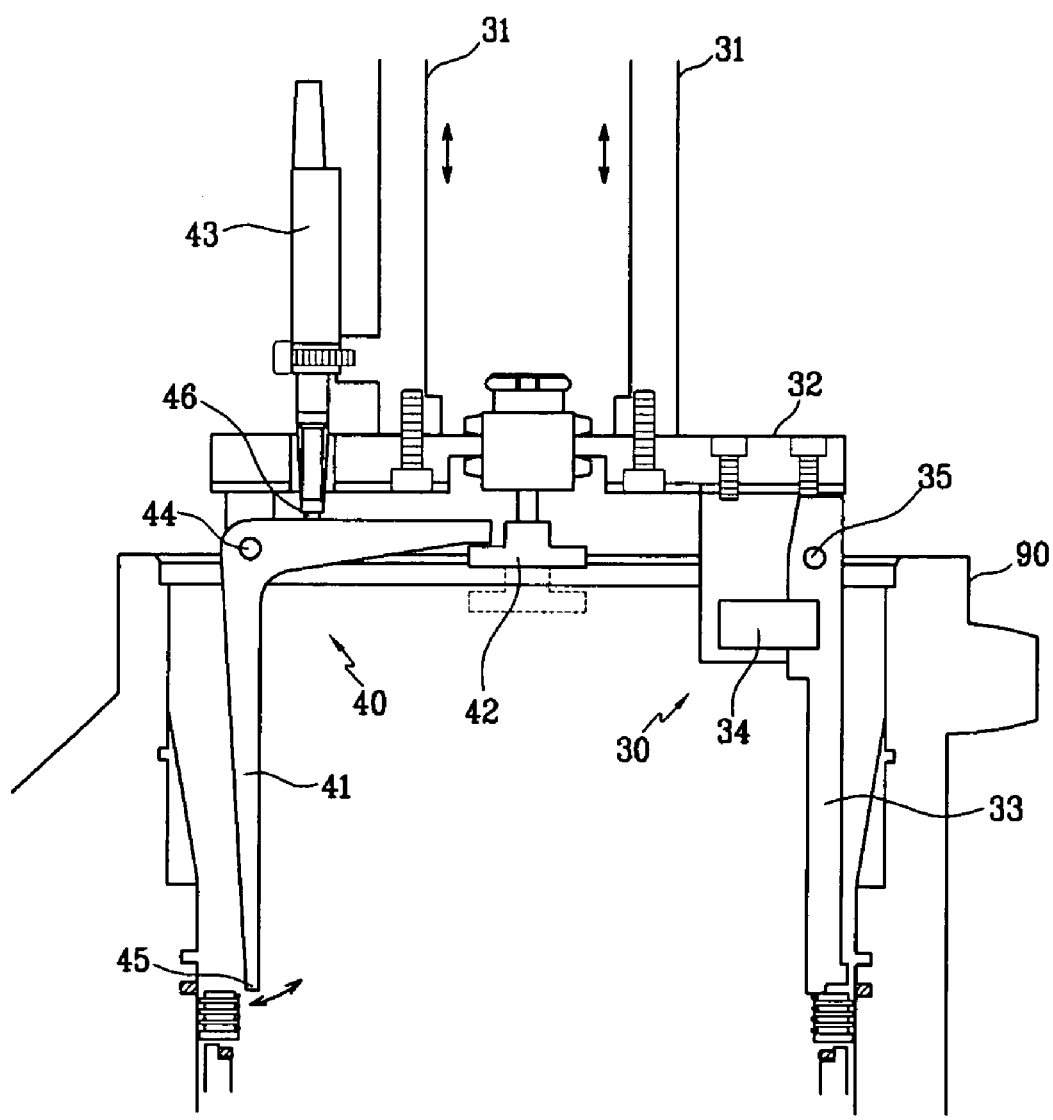
FIG. 5 and FIG. 6 show a snap ring inner diameter measuring jig of a system for mounting a snap ring according to an exemplary embodiment of the present invention.

Referring to FIG. 5, the snap ring assembling unit 30 includes a supporting portion 32 connected to the supporting structure 10 by a second actuating device 31, a snap ring assembling jig 33, and a third actuating device 34. The supporting portion 32 can move with respect to the supporting structure 10 by operation of the second actuating device 31.

In an exemplary embodiment of the present invention, the snap ring assembling jig 33 is connected to the supporting portion 32 by a pivot pin 35, and the third actuating device 34 selectively pushes the snap ring assembling jig 33 such that it pivots around the pivot pin 35.

Figure 3:
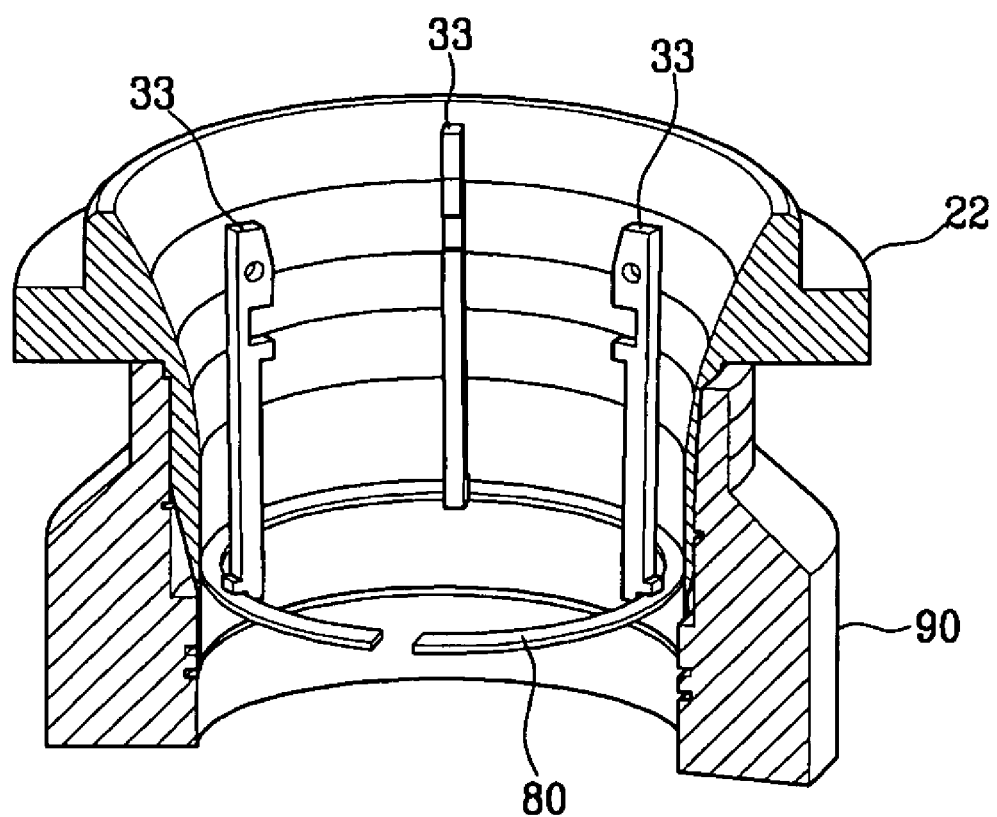
FIG. 3 and FIG. 4 show operations of a snap ring assembling jig of a system for mounting a snap ring according to an exemplary embodiment of the present invention.

One snap ring assembling jig 33 is shown in FIG. 1 for convenience; three snap ring assembling jigs 33 are shown in the embodiment shown in FIG. 3. Any number of snap ring assembling jigs 32 may be provided.

The supporting portion 32 moves toward the workpiece 90 by operation of the second actuating device 31. The snap ring assembling unit 30 and the snap ring inner diameter measuring unit 40 move toward the workpiece 90 after passing through the snap ring guide 22.

Figure 4:
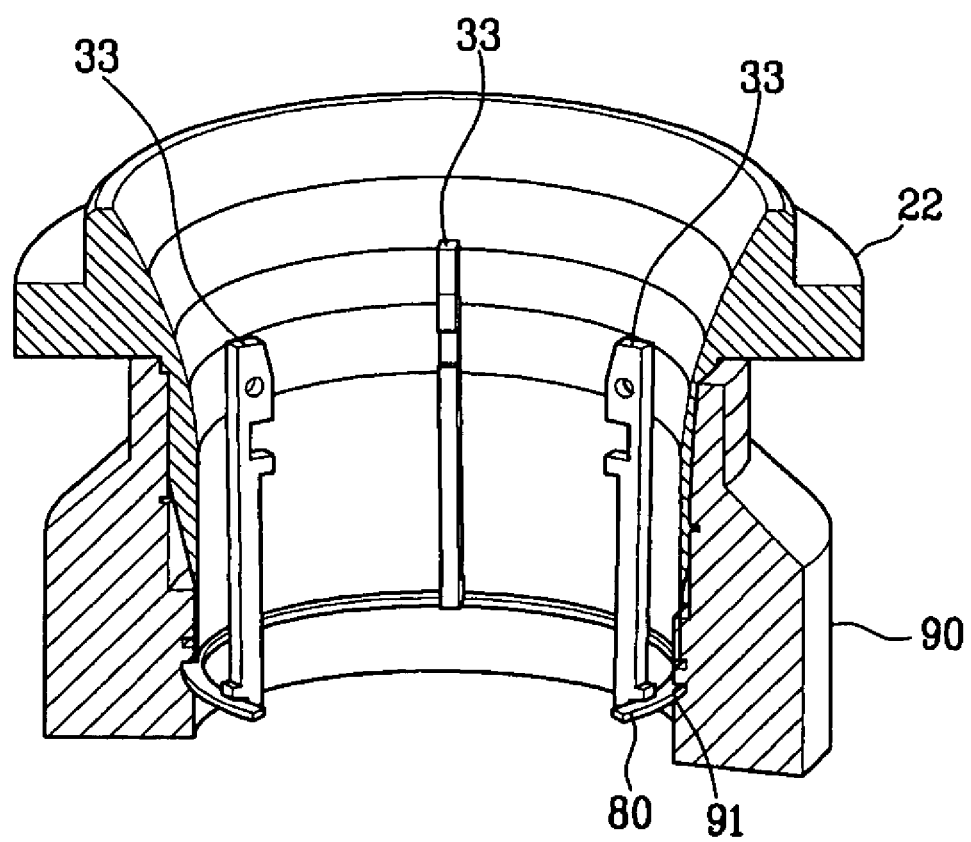

When the supporting portion 32 moves toward the workpiece 90, the snap ring assembling jig 33 also moves toward the workpiece 90. Accordingly, when the snap ring assembling jig 33 passes through the snap ring guide 22, the snap ring assembling jig 33 pushes the snap ring 80, disposed within the snap ring guide 22, toward the snap ring mounting position 91 of the workpiece 90. A state where the snap ring 80 is being pushed by the snap ring assembling jig 33 is shown in FIG. 3, and a state where the snap ring 80 is positioned within the snap ring mounting position 91 after being pushed by the snap ring assembling jig 33 is shown in FIG. 4.

When the snap ring assembling jig 33 rotates, a front end (a lower end in the drawing) of the snap ring assembling jig 33 moves in an outer radial direction of the snap ring guide 22. Therefore, when the snap ring assembling jig 33 passes through the snap ring guide 22, the front end thereof contacts an inner surface of the snap ring guide 22, and accordingly the snap ring 80 can be more effectively pushed by the snap ring assembling jig 33 toward the workpiece 90.

Figure 6:
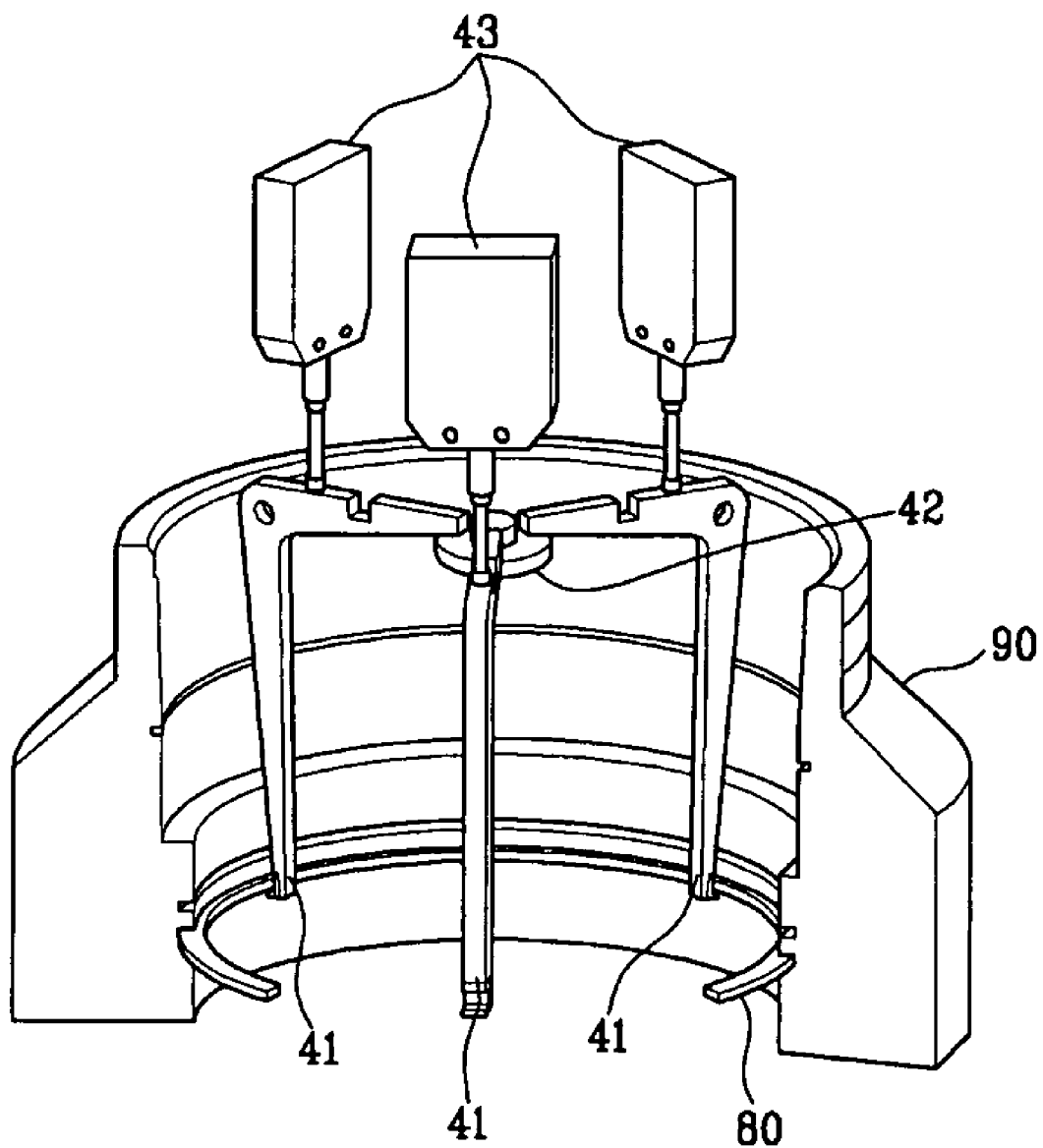

Referring to FIGS. 5 and 6, the snap ring inner diameter measuring unit 40 includes a snap ring inner diameter measuring jig 41, a fourth actuating device 42, and a linear gauge 43.

The snap ring inner diameter measuring jig 41 is pivotally connected to the supporting portion 32 of the snap ring assembling unit 30 by a pivot pin 44.

The fourth actuating device 42 lifts an end of the snap ring inner diameter measuring jig 41, so that the snap ring inner diameter measuring jig 41 rotates with about the pivot pin 44. This causes a front end 45 of the snap ring inner diameter measuring jig 41 to move in an inward radial direction of the snap ring guide 22. On the other hand, if the fourth actuating device 42 is in the state shown by a dotted line in FIG. 5, the snap ring inner diameter measuring jig 41 rotates clockwise in the drawing due to its own weight, so that the front end 45 of the snap ring inner diameter measuring jig 41 moves in an outward radial direction of the snap ring guide 22.

To measure an inner diameter of the mounted snap ring, the fourth actuating device 42 is positioned at the position shown by a dotted line in FIG. 5 and the snap ring inner diameter measuring jig 41 rotates outward by its own weight such that the front end 45 of the snap ring inner diameter measuring jig 41 contacts an interior circumference of the mounted snap ring 80.

The linear gauge 43 measures the inner diameter of the snap ring 80, mounted to the mounting position 91, in response to a pivotal movement of the snap ring inner diameter measuring jig 41. The linear gauge 43 is a conventional linear gauge.

A front end 46 of the linear gauge 43 is movable by being elastically supported by an elastic member, and contacts an upper surface of the snap ring inner diameter measure jig 41 as shown in FIG. 6. Accordingly, when the front end 45 of the snap ring inner diameter measuring jig 41 contacts an interior circumference of the mounted snap ring 80, a position of the snap ring inner diameter measuring jig 41, which corresponds to the inner diameter of the snap ring 80, is measured by the linear gauge 43.

One snap ring inner diameter measuring jig 41 is shown in FIG. 1 and FIG. 5 for convenience; three snap ring inner diameter measuring jigs 41 are shown in the embodiment in FIG. 6. Any number of snap ring inner diameter measuring jigs 41 can be provided.

In one embodiment of the present invention, three snap ring assembling jigs 33 and three snap ring inner diameter measuring jigs 41 are alternately connected to the supporting portion 32 of the snap ring assembling unit 30.

The first actuating device 21, the second actuating device 31, the third actuating device 34, and the fourth actuating device 42 can be any conventional actuators, such as hydraulic or pneumatic cylinders.

Figure 7:
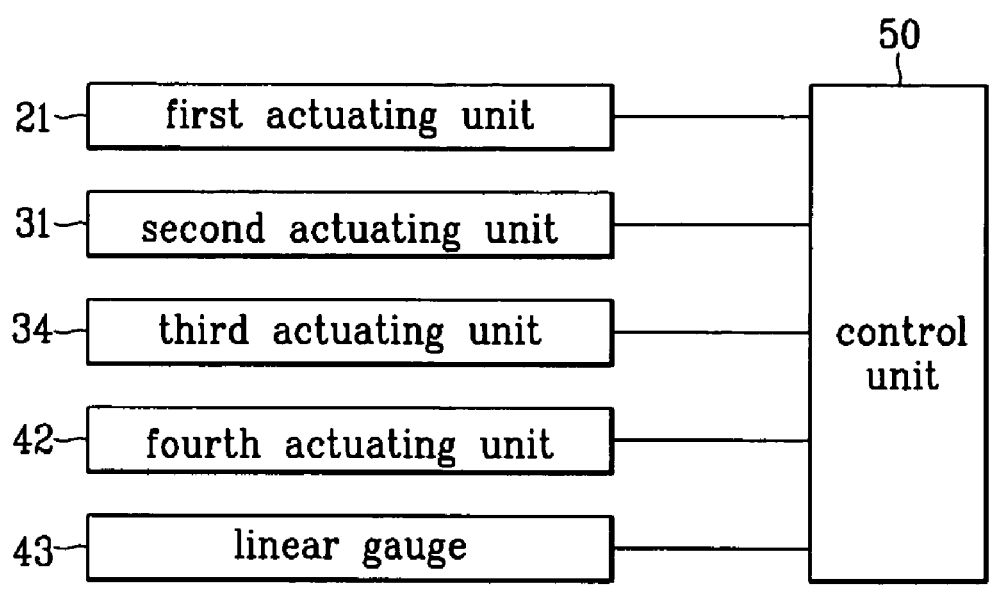
FIG. 7 is a drawing showing a control unit and elements connected to the control unit of a system for mounting a snap ring according to an exemplary embodiment of the present invention.

Referring to FIG. 7, a system for mounting a snap ring according to an exemplary embodiment of the present invention includes a control unit 50.

The control unit 50 controls operations of the first actuating device 21, the second actuating device 31, the third actuating device 34, and the fourth actuating device 42, and determines whether the snap ring has been accurately mounted based on a comparison of the inner diameter of the snap ring measured by the snap ring inner diameter measuring unit 40 and a predetermined value.

The predetermined value can be set as a value of an inner diameter of a snap ring 80 that has been accurately mounted to the snap ring mounting position 91. If the measured inner diameter of the snap ring does not differ from the predetermined value by a preset percentage of the predetermined value, it may be determined that the snap ring has been accurately mounted to the mounting position. The preset percentage is preferably about 10%.

The control unit 50 may comprise a processor, a memory, and associated hardware, software, and/or firmware as may be selected and programmed to perform each step for mounting a snap ring, measuring an inner diameter of the snap ring, and determining whether a snap ring has been accurately mounted by a person of ordinary skill in the art based on the teachings of the present invention. The predetermined value of an accurately mounted snap ring may be stored in the memory.

In more detail, the control unit 50 controls the first actuating device 21 to operate such that the snap ring guide 22 of the snap ring guide unit 20 contacts the workpiece 90. Then, the control unit 50 controls the second actuating device 31 to operate such that the snap ring assembling unit 30 passes through the snap ring guide 22 thereby moving into the workpiece 90, and accordingly, the snap ring assembling jig 33 pushes the snap ring 80 and the snap ring 80 is mounted to the snap ring mounting position 91.

While the snap ring assembling jig 33 pushes the snap ring 80 toward the snap ring mounting position 91, the control unit 50 controls the third actuating device 34 to operate so that the front end of the snap ring assembling jig 33 contacts an interior surface of the snap ring guide 22. Therefore, the snap ring 80 can be more accurately pushed.

In addition, the control unit 50 controls the fourth actuating device 42 to operate while the snap ring assembling jig 33 pushes the snap ring 80, so that the front end of the snap ring inner diameter measuring jig 41 moves in an inward radial direction of the snap ring guide 22. Therefore, while the snap ring 80 is mounted, the snap ring inner diameter measuring jig 41 does not hinder the mounting operation. In addition, after the snap ring 80 is mounted, the control unit 50 turns off the fourth actuating device 42 so that the snap ring inner diameter measuring jig 41 rotates by its own weight, thereby contacting an interior circumference of the snap ring 80. Accordingly, an inner diameter of the mounted snap ring can be precisely measured.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for mounting a snap ring to a workpiece, comprising:
    a supporting structure;
    a snap ring guide unit movably connected to the supporting structure;
    a snap ring assembling unit movably connected to the supporting structure;
    a snap ring inner diameter measuring unit movably connected to the supporting structure; and
    a control unit that controls positions of the snap ring guide unit, the snap ring assembling unit, and the snap ring inner diameter measuring unit with respect to the supporting structure, and determines whether the snap ring has been accurately mounted, wherein the snap ring assembling unit comprises:
    a supporting portion movably connected to the supporting structure by a second actuating device;
    at least one snap ring assembling jig pivotally connected to the supporting portion; and
    at least one third actuating device, which selectively pivots the at least one snap ring assembling jig.

2. The system of claim 1, wherein the snap ring guide unit is movably connected to the supporting structure by a first actuating device.

3. The system of claim 1, wherein the snap ring inner diameter measuring unit comprises:
    at least one snap ring inner diameter measuring jig pivotally connected to the supporting portion of the snap ring assembling unit;
    at least one fourth actuating device, which selectively pivots the at least one snap ring inner diameter measuring jig; and
    at least one linear gauge that detects a pivotal position of the at least one snap ring inner diameter measuring jig.

4. The system of claim 1, wherein the control unit determines whether the snap ring has been accurately mounted based on a comparison of a snap ring diameter measured by the snap ring inner diameter measuring unit and a predetermined value.

5. The system of claim 1, wherein the at least one third actuating device selectively pivots the at least one snap ring assembling jig such that an end of the at least one snap ring assembling jig moves in an outward radial direction of the snap ring guide unit.

6. The system of claim 3, wherein:
    the at least one snap ring inner diameter measuring jig is configured such that an end thereof moves in an outward radial direction of the snap ring guide unit when the at least one fourth actuating device is in an "off" state; and
    the at least one fourth actuating device selectively pivots the at least one snap ring inner diameter measuring jig such that the end of the at least one snap ring inner diameter measuring jig moves in an inward radial direction of the snap ring guide unit.

7. The system of claim 6, wherein the control unit operates the at least one fourth actuating device such that the end of the at least one snap ring inner diameter measuring jig remains disposed in the inward radial direction of the snap ring guide unit while the at least one snap ring assembling jig pushes the snap ring toward the workpiece.

* * * * *